United States Patent Office 3,203,202
Patented Aug. 31, 1965

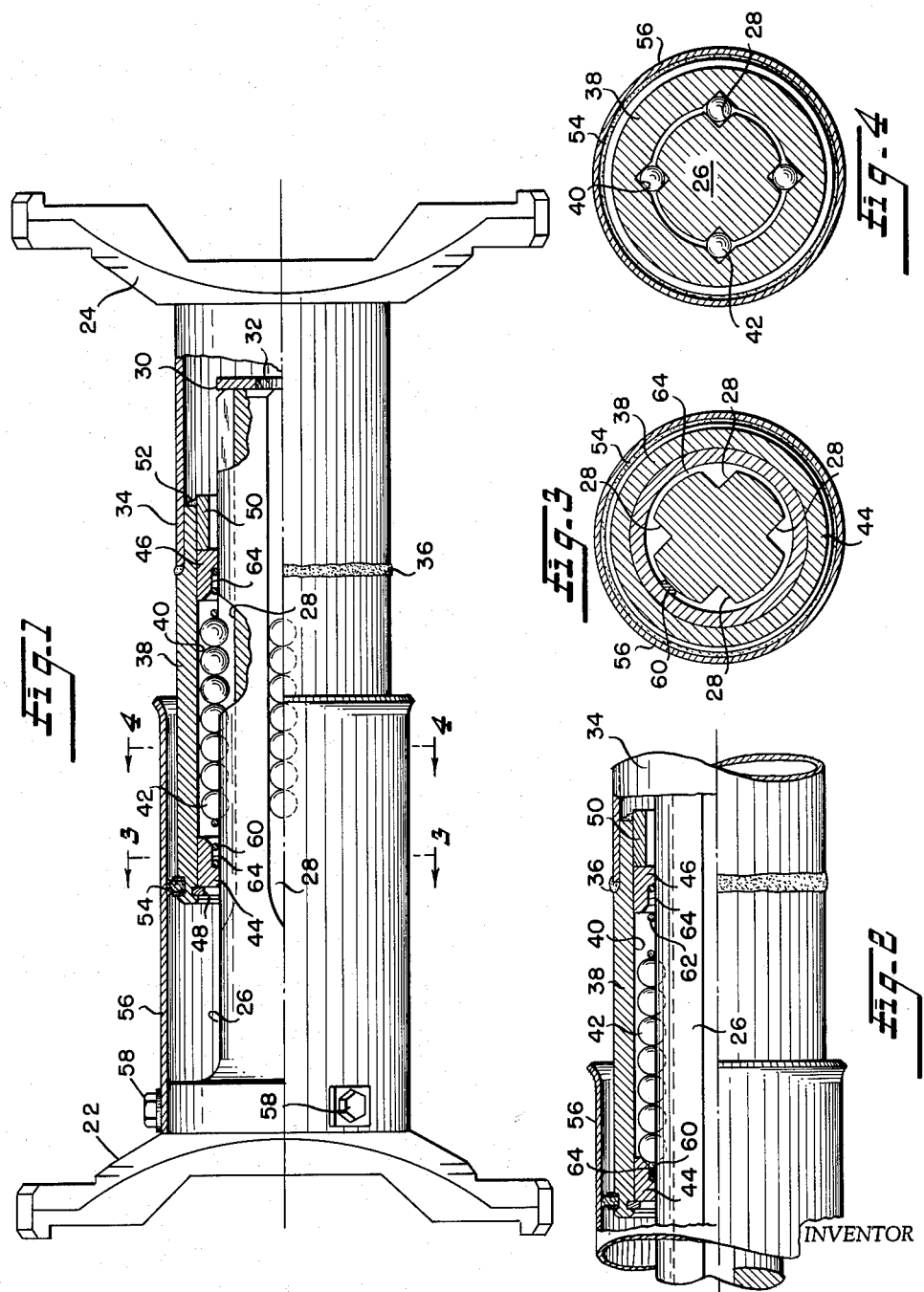

3,203,202
EXTENSIBLE DRIVE CONNECTIONS
Nelson R. Brownyer, Birmingham, Mich., assignor, by mesne assignments, to Rockwell-Standard Corporation, a corporation of Delaware
Filed Mar. 29, 1963, Ser. No. 268,981
2 Claims. (Cl. 64—23)

This invention relates to extensible drive connections and more particularly to telescoping joints particularly adapted for use in vehicle drive or propeller shafts.

In many vehicles the drive or propeller shaft connects a driving member mounted on the vehicle frame to a spring suspended final drive assembly. Accordingly, in a normal operation of the vehicle the length of the propeller shaft varies constantly. Many prior proposals have been made to provide the required telescoping joints but none have been wholly satisfactory. For example, a simple spline connection, when acting under a heavy torsional load, develops excessive friction along the lateral edges of the splines which in turn reduces the ability of the propeller shaft to extend or contract except under axial forces which unduly load the universal joints provided at the opposite ends of the propeller shaft.

In recognition of this defect of the conventional splined joints it has also been proposed to provide ball slip joints. In this type of construction inner and outer telescoping propeller shaft members are provided with grooves which receive series of balls which perform the dual function of transmitting torsional loads between the telescoping members and accommodating the required change in length of the propeller shaft. In such a construction it is essential that the balls roll as the propeller shaft is lengthened or shortened since sliding action of the balls leads to rapid deterioration of the balls or the grooves in which they are received and involves a friction load approximately as high as that developed in the conventional splined joint.

It has been found in practice that normal vibration and shock loads applied to the propeller shaft, which is usually inclined, are sufficient to cause the balls to leave their normal centered position and progress toward the lower end of the grooves in which they are received. When this condition obtains the balls are no longer free to roll with the disadvantages referred to above.

In an attempt to overcome this problem it has been proposed to position the balls in cages of various types. However, such expedient did not solve the problem and in many designs the construction was such that the cages were crushed under the high loads developed in operation.

With these considerations in mind it is a primary purpose and object of the present invention to provide improved ball type extensible drive connections affording improved performance and longer life.

It is a further object of the invention to provide improved ball type extensible drive connections including novel means for maintaining the balls in rolling contact with the telescoping drive members under normal operating conditions.

It is also an object of the present invention to provide improved ball type extensible drive connections which are of relatively simple mechanical construction, and extremely rugged and durable and which may be manufactured and sold at competitive cost.

Additional objects and advantages of the present invention will become apparent as the description proceeds in connection with the accompanying drawings in which:

FIGURE 1 is a central vertical half section of a propeller shaft assembly embodying the slip joint of the present invention, the parts being shown in their mid-position;

FIGURE 2 is a fragmentary view similar to FIGURE 1 showing the joint in its fully extended position for rolling contact; and FIGURES 3 and 4 are transverse sections taken along lines 3—3 and 4—4, respectively, of FIGURE 1.

The propeller shaft assembly incorporating the novel extensible connection of the present invention is equipped with conventional universal joint fittings 22 and 24 for connection to any of a number of widely varying vehicle drive systems, typical examples of which are shown in U.S. Patents 2,851,115 and 2,870,853.

Attached to the universal fitting 22 is an elongated substantially cylindrical solid inner shaft member 26 provided with any suitable number, for example, four V-shaped or semi-circular grooves 28 equally spaced around its circumference. The outer ends of the grooves 28 are closed by a ring 30 welded as at 32 to the end of the inner member 26. The portion of the propeller shaft attached to the universal joint fitting 24 comprises a cylindrical tube 34 welded or otherwise secured to the fitting. At its opposite end the tube 34 is welded as at 36 to a heavy hollow outer shaft member 38 which, as best shown in FIGURE 4, is provided with a plurality of internal grooves 40 matching the external grooves 28 in the internal member 26 to provide a series of tracks in which groups of hardened steel balls 42 are positioned. The ends of the tracks in which the balls 42 are received are formed by stop assemblies including identical annular stop members 44 and 46, the former being held against one end of the central grooved portion of the sleeve 38 by a snap ring 48 and the latter being similarly positioned by a ring 50 welded as at 52 to the end of the sleeve 38. The stop members 44 and 46 each bridge the radial space between the inner and outer shaft members 26 and 38 and, as shown in FIGURES 1, 2 and 3, are provided with concentric inner and outer cylindrical surfaces which effectively maintain the inner and outer shaft members in radially spaced concentric relation and in axial alignment.

A seal ring 54, suitably mounted on the end of the sleeve 38, engages the inner surface of a tubular shield 56 secured by bolts 58 to an enlarged portion of the inner cylindrical member 26. The seal ring 54 guards against the entry of dirt and other foreign matter and prevents the escape of lubricant provided within the slip joint.

It is a feature of the present invention of particular importance that the groups of balls 42 are urged into light contact with each other and are centered in the spaces provided for them between the stops 44 and 46 by a pair of identical matched balanced coil springs 60 and 62 which are compressed between the adjacent ends of the group of balls 42 and the ends of the recesses 64 and 66 in the respective stop members 44 and 46. The parts are assembled so that the groups of balls 42 occupy their mid position with the balancing springs 60 and 62 extended equally as shown in FIGURE 1 when the universal joint fittings 22 and 24 are spaced apart just sufficiently to make a connection under normal load conditions. As the propeller shaft elongates or contracts from this position the balls roll smoothly in the tracks provided by the mating grooves 28 and 40 with extremely low friction to minimize the axial loads on the universal joint fittings 22 and 24. It will be understood that the centers of the balls shift axially only half the change in distance between the fittings 22 and 24 and the joint thus provides a considerable range of travel despite its compactness.

Since the balls are in rolling contact with the grooves they normally do not slide within the grooves and tend to maintain their position even in the absence of the springs 60 and 62. However, because of vibration and occasional shock loads and the normal inclination of the propeller shaft assembly it has been found that in the absence of the springs 60 and 62 the balls do tend to shift toward the lower end of the space in which they are received. If for example, the universal joint fitting 24 is lower than the fitting 22 the balls 42 will tend to shift to the right as viewed in FIGURE 1 until their movement is arrested by the stop 46. When this occurs the propeller shaft cannot be contracted without producing sliding movement of the balls which, because of high friction forces developed, may damage the balls or the tracks in which they are received or unduly stress the remaining components of the drive line.

This result is effectively prevented by the balancing springs which exert a small positive centering pressure sufficient to retain the ball group in its desired intermediate position, thus, assuring even after extended periods of operation that the full design range of elongation and contraction of the propeller shaft will be obtained by a purely rolling action of the balls.

It has been established by actual test that the friction developed between the adjacent surfaces of the balls is negligible. Accordingly, it has been found unnecessary, contrary to prior practice, to separate the balls with a cage or a similar device, thus, substantially decreasing the weight, cost, and complexity of the unit.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An extensible torque transmitting drive shaft assembly comprising an inner driving shaft member, an outer hollow driven shaft member surrounding a portion of said inner shaft member, there being an annular space between said inner and outer members and said members being adapted to move axially between limit positions, said members having mating groove spaces, means rigid with said inner member closing the ends of the groove spaces therein, a pair of axially spaced stop assemblies carried by said outer member forming the ends of said groove spaces, said stop assemblies radially bridging the space between said inner and outer shaft members and having inner and outer guide surfaces engageable, respectively, with said inner and outer members to maintain said inner and outer members in radially spaced concentric relation and in axial alignment, at least one of said stop assemblies being removably mounted in said outer member to permit the selective opening and closing of one end of said groove spaces, a group of torque transmitting balls received in each groove space and in rolling contact with the surfaces thereof, the balls in each group being in contact with adjacent balls of said group and drivingly connecting said inner and outer shaft members, the aggregate axial length of said groups of balls being less than the length of said groove spaces, and opposed spring means compressed between the ends of said groups of balls and said stop assemblies maintaining said balls axially centered in the groove spaces when said inner and outer shaft members occupy a centered position between said limit positions.

2. The combination according to claim 1 together with a shield carried by said inner member in surrounding relation with said outer member, and a seal extending radially between said shield and said outer member to prevent the entry of foreign matter into the interior of said assembly.

References Cited by the Examiner
UNITED STATES PATENTS

| | | | |
|---|---|---|---|
| 846,079 | 3/07 | Yost | 64—23 |
| 2,116,290 | 5/38 | Spicer | 64—23 |
| 2,269,254 | 1/42 | Cribb. | |
| 2,833,598 | 5/58 | Sloyan. | |
| 2,932,180 | 4/60 | Smith-Pert | 64—23.7 |
| 2,952,145 | 9/60 | Thompson | 64—23.7 |
| 3,003,827 | 10/61 | Hentschke. | |

ROBERT C. RIORDON, *Primary Examiner.*